Oct. 18, 1966   G. T. RANDOL   3,279,328
ANNULAR PLIANT PACKING FOR SEALING RECIPROCATING COMPONENTS
Original Filed March 16, 1962
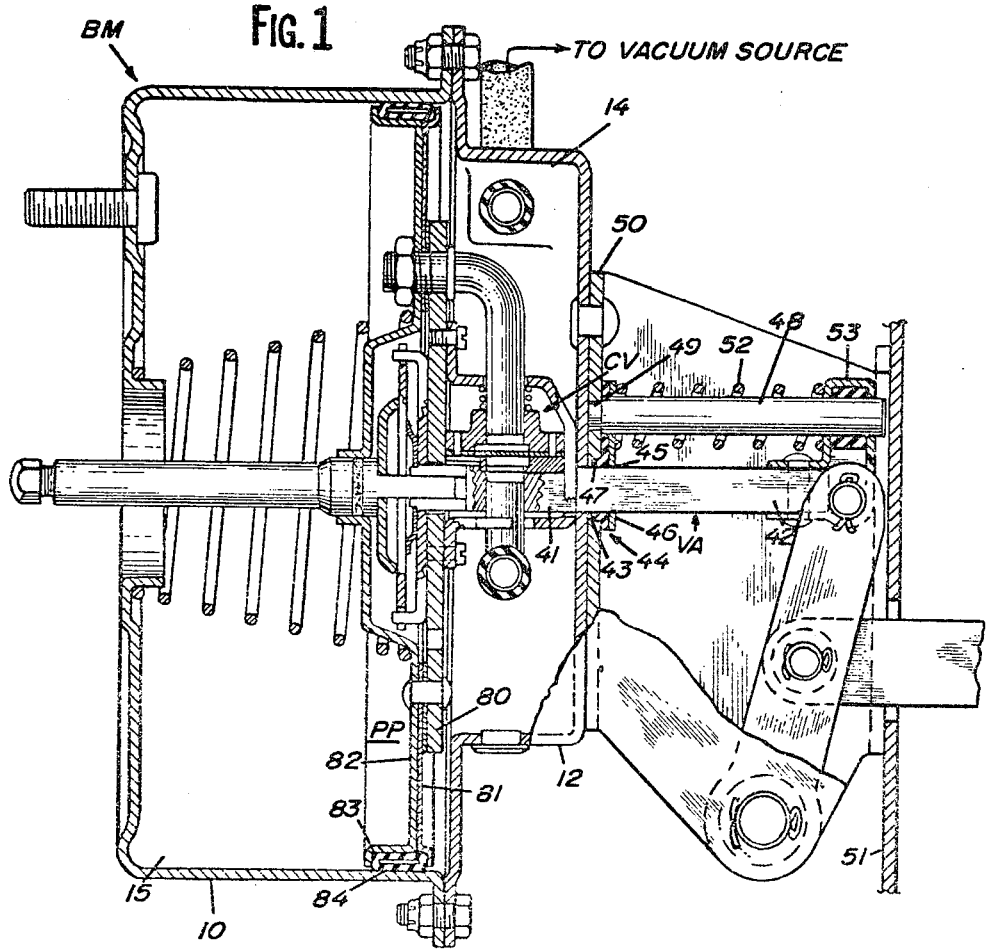
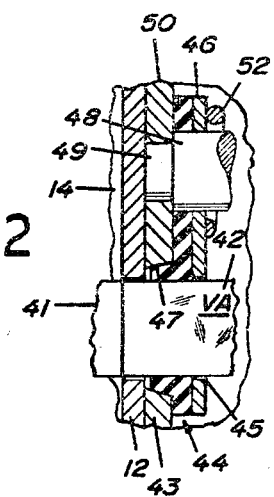
Inventor United States Patent Office 3,279,328
Patented Oct. 18, 1966

3,279,328
ANNULAR PLIANT PACKING FOR SEALING RECIPROCATING COMPONENTS
Glenn T. Randol, P.O. Box 275, Mountain Lake Park, Md.
Original application Mar. 16, 1962, Ser. No. 180,294, now Patent No. 3,212,408, dated Oct. 19, 1965. Divided and this application Oct. 1, 1965, Ser. No. 492,182
4 Claims. (Cl. 91—376)

This application is a division of my copending application Serial No. 180,294, filed March 16, 1962 now issued to Patent No. 3,212,408, dated October 19, 1965.

In my copending application referred to, I have disclosed a pressure differential operated brake booster servomotor comprising a fluid chamber enclosure (double-ended power cylinder) in which a piston-like power member moves under influence of said pressure differential created by a negative pressure (vacuum) applied to one side of said power member. In prior art devices of this general character in which an operator-operated member (brake-pedal) is utilized for controlling in part the power-piston, sealing problems still persist with respect to the operator member. Workers in the art to which the present invention relates, have resorted to various designs of spring-biased packings in an effort to produce an effective and serviceable seal between the operator member which projects through one of the end walls of said power cylinder, but such prior sealing proposals have their shortcomings of early leakage, and being complicated and costly.

The present invention seeks to overcome the above mentioned problems by providing an economical and simple sealing means at the critical point above mentioned, and which is characterized by a constant thrust pressure produced by a normally compressed spring effective to maintain intimate sealing contact of complemental working surfaces between the sealing means and operator member and to bias the latter toward normal position.

There are certain features of construction and operation of the present sealing means which are applicable to servomotors other than my disclosed patented servomotor, and which may be utilized in operative association with activatable systems and/or devices other than those which characterize a vehicular braking system. These features of the sealing means form the subject-matter of the present application.

The present invention, therefore, has for a primary objective the provision of new and improved annular sealing means characterized by a wedging-action for effectively sealing the working surfaces between a power cylinder and an operator member reciprocable relatively thereto to control in part operation of said cylinder.

More specifically, the aforesaid sealing means comprise a novel spring-biased packing at the point where the valve actuator operably projects through the end wall of the power cylinder for connection to pedal-operating linkage, and wherein such spring bias is continuously effective to yieldably oppose pedal operation of said valve actuator from normal position and to maintain said wedgelike action on the packing around said valve actuator for sealing of the latter.

Another object related to the object next above, is to provide complemental tapering surfaces defining an exterior portion of said packing and an opening through the end wall of said power cylinder through which said valve actuator passes whereby said spring bias on said packing is effective to produce a wedgelike action between said tapering surfaces and thereby applying radial pressure inwardly on said packing toward the axis of said valve actuator to effectively seal the latter, said spring bias also being continuously effective to operate the valve actuator toward its normal fully retracted position.

Additional objects and advantages of my invention will be apparent from the following description, reference being had to the accompanying drawing wherein:

FIGURE 1 is a longitudinal-vertical section of my patented brake booster device exemplarily embodying sealing means operatively associated with the operator-operated valve member thereof, and wherein said sealing means are constructed in accordance with the principles of the present invention; and FIGURE 2 is a fragmentary sectional view taken from FIGURE 1 on an enlarged scale, for clarifying details of said spring-biased packing operably related with said valve member.

Referring now to the drawing wherein I have disclosed in FIGURES 1 and 2 the spring-biased sealing means constituting the present invention in operative association with a fluid-pressure-operated booster motor herein disclosed as vacuum-operated and generally designated by the reference character "BM" which comprises a fluid chamber enclosure (power cylinder) 10 in which a power-piston assembly (member) "PP" is reciprocably disposed for movement under influence of a pressure differential applied to opposite sides thereof by operation of a follow-up control valve "CV" to selectively control connection of one side of said power-piston PP to the atmosphere and to a source of negative pressure created to produce such pressure differential, such as vacuum produced within the inlet-manifold of an internal-combustion engine when operating to propel any conventional motor vehicle and the like as is understood, and the other side of said power-piston being continuously vented to the atmosphere. The open end of said cylinder 10 is closed by a cup-shaped member 12 as shown in FIGURE 1, and the said power-piston serves to divide said power cylinder into a constant atmospheric pressure chamber 14 and a vacuum-power chamber 15, the latter chamber being selectively connectible to said vacuum source and to atmosphere by operation of said control valve CV. The control valve is operated in part by a valve actuator having rectilinear movement and designated as a whole "VA", and which is disclosed herein in the form of a horizontally disposed member in rectangular cross section having a normal width portion 41 wholly disposed within said power cylinder and a narrower portion 42 projecting rearward to the exterior of the closure member 12. This narrower portion 42 may be produced in rectangular or circular cross section connected at its inner end to the normal width portion 41 within the power cylinder chamber 14 to move as a unit.

Aligned rectangular openings of substantially the same size and configuration as the narrow portion 42, are provided through the central portions of the end wall of the closure member 12 and sealing lip portion 43, respectively, best demonstrated in FIGURE 2, said portion projecting laterally from the lower portion of a vertically elongated rubber sealing grommet (packing) 44, the outer surface of the sealing lip being annular and tapered for an important purpose to appear. An aperture 45 complemental to the aforesaid openings, is provided in the lower portion of a pressure-applying backing plate 46 which overlies the outer face of said packing 44, and which is adapted to stabilize the packing in effective sealing relationship with respect to the narrow portion 42 as shown in FIGURE 2. The narrow portion 42 of the valve actuator VA passes through said openings and aperture to the exterior of the closure member 12 for actuation by a connected operator-operated member (brake-pedal) not shown. The annular outer tapered surface on the sealing lip 43 projects into a complementally tapered opening 47, said tapered surfaces cooperating to produce a wedging-action on the lip portion 43 and thereby applying a radially directed pressure on said latter portion toward the axis of said valve actuator to effect an intimate sealing contact around the narrow portion 42 of the valve actuator VA to maintain an airtight seal therebetween throughout the full operating stroke of said valve actuator. A rod 48 is adapted to slidably support the outer end of said valve actuator as shown in FIGURE 1 to stabilize rectilinear movement of the latter under influence of operator force exerted thereon. This support rod is spaced parallelly with respect to the axis of the valve actuator VA with one end 49 fixed to a forward interconnecting segment 50 in which said tapered opening 47 is processed, of a mounting bracket assembly designated "BR" for said booster motor BM. The mounting bracket is fixed on the closure member 12 as by a plurality of rivets which passes through the segment 50 as shown in FIGURE 1, mount the booster motor in operating position, preferably on the engine-side of the vehicle firewall 51 as shown in FIGURE 1.

A normally compressed spring 52 encircles said support rod 48 to continuously react at its opposite ends against the aforesaid backing (pressure) plate 46 and a confronting U-shaped member 53 attached to the outer end of said valve actuator VA by means of a rivet, to thereby bias the valve actuator VA toward its normal fully retracted position as shown in FIGURE 1, and to continuously apply thrust pressure to the backing plate 46 therefore against the packing 44 to stabilize the latter in effective sealing (wedging) position around the reduced portion 42 of said valve actuator. The U-shaped member 53 nests a pliant block between the spaced vertical legs thereof, said block serving as a bearing for the valve actuator to slide back and forth on the support rod 48 as shown in FIGURE 1, and is provided with a hole in registry with similar size holes through the upper end portions of said legs, and through which the rod 48 passes. It is important to note here that co-action of the backing plate 46 and annular lip portion 43 on said packing 44, under influence of the spring 52, produces novel biasing means against said lip portion to maintain the latter in airtight sealing relationship around the reduced actuator portion 42, and at the same time, this biasing means (spring 52) serves to bias the valve actuator VA and connected control valve parts toward their respective normally released positions as shown in FIGURE 1. Therefore, it may be said that spring 52 has a twofold function of maintaining the packing seal 43 in effective sealing position, and of returning the valve actuator to fully retracted position.

The power-piston PP construction includes a circular master thrust plate 80 which backs a juxtaposed first thrust plate 81 of annular configuration, and a secondary support and sealing plate 82, the first and second plates are horizontally flared to terminate each of their peripheral marginal portions in a short vertically disposed end to produce an annular packing channel 83 of substantially rectangular configuration. Fitted into this channel is an annular tubular packing member disclosed herein in the form of a pliant tube 84.

In summary, it should be manifest that the foregoing disclosure demonstrates my novel wedge-type packing 44 as being characterized by long service life without restricting movement to either the power-piston PP or the valve actuator VA.

Reference is again made to FIGURE 2, to importantly point out that the actuating spring 52 for the valve actuator VA is employed to continuously apply pressure on the packing 44 to effect airtight wedging relationship thereof around the reduced portion 42 and to simultaneously oppose pedal-actuation of the valve actuator VA thereby serving as a return spring for the latter. The spring may apply thrust directly against the lip portion of the packing 44 or via the aforesaid pressure-transmitting plate 46 to effect the wedgelike action produced by the tapering surfaces on the lip portion 43 and opening 47 as a function of the uninterrupted biasing action from said spring. Utilization of a single spring to control the return of the valve actuator and to apply sealing pressure therefor simplifies the construction of the control valve parts and the manner in which they are related with the power cylinder 10 and power-piston PP reciprocably disposed therein, thus producing a more simplified and economical booster brake unit free of sealing problems where the pedal-actuated elements are concerned. It is believed that the use of a single spring for returning one of the valve parts to its normal relaxed position as shown in FIGURE 1 and for producing the sealing pressure for such part constitutes an advance in the art.

A preferred embodiment of the invention is illustrated and described, however, the underlying concept is obviously applicable in installations other than my patented booster motor BM which would readily occur to persons skilled in the related art. Therefore, the invention is to be limited only in accordance with the terms of the subjoined claims.

Having thus described my invention, I claim:

1. In a power booster unit adapted to assist in pressurizing the brake-fluid in a hydraulic brake system for motor vehicles and the like, to apply and release the brakes thereof, and having a wall movable from normal position within a double-ended power cylinder under control of two cooperable relatively movable elements comprising a control valve, one of said elements being movable with said wall as a unit, and the other element being operator-actuatable to produce follow-up control over said wall, the latter dividing the interior of said power cylinder into opposing fluid chambers, the improvement which comprises: a member operatively related with one of said valve elements and which is characterized by rectilinear movement from normal position under operator-actuation; a central opening in one end of said power cylinder through which said member operably projects to the exterior thereof; an annular tapering surface defining said opening; a sealing element having an opening coaxial with said first-defined opening, and through which said member projects; an annular tapering surface defining the exterior of said sealing element, and which is adapted to cooperate in a wedging manner with the tapering surface defining said first-defined opening; a thrust-applying element having an opening coaxial with the two aforesaid openings and through which said member operably projects, said thrust element being positioned contiguously to the side of said sealing element opposite its tapering surface; and a normally compressed spring continuously reacting between the said thrust element and said rectilinearly movable member to bias the latter toward normal position and to simultaneously transmit a progressively diminishing bias on said thrust element without interrupting thrust pressure on the latter and said sealing element and thereby effecting an airtight wedgelike seal between said seal opening and said reciprocable member to isolate the fluid chamber defined by the one end of said power cylinder from the exterior of the latter.

2. A sealing element for isolating differential pressures on opposite sides, respectively, of an apertured wall through which a reciprocable member operably projects from a normal position, comprising an annular tapered working surface on the exterior of said sealing element and which is adapted to cooperate in a wedgelike manner with an annular tapered working surface defining said wall aperture, to bias the sealing element radially inwardly around said reciprocable member and thereby effecting an airtight seal between the latter member and said sealing element to isolate pressure differential conditions on opposite sides, respectively, of said wall; a thrust-applying element disposed contiguously to said sealing element and which is adapted to apply a continuous thrust against said sealing element on the side thereof opposite its tapered surface; and spring means including a normally compressed spring adapted to continuously react between said thrust-applying element and said reciprocable member to effect retraction of the latter toward normal position and to simultaneously maintain thrust against said thrust element to induce said wedgelike action between said tapering surfaces whereby intimate sealing contact is maintained between said sealing element and said reciprocable member irrespective of the operating position of the latter.

3. An annular sealing element encircling a portion of a shaft reciprocable relatively thereto from normal position, and a fixed member having an annular recess for reception of said sealing element, the improvement which comprises: a pair of cooperating working surfaces on said sealing element and said recess, respectively; a thrust-applying member adapted to apply pressure against said sealing element to move said working surfaces relatively with respect to each other to effect a wedging action therebetween on said sealing element in a radial direction toward the axis of said shaft without impairing the free movement of the latter; and a normally compressed spring continuously reacting between said thrust-applying member and said shaft to produce the pressure transmittable by said thrust member and to simultaneously effect movement of said shaft toward its normal position.

4. An annular pliant sealing element encircling a portion of a shaft characterized by rectilinear movement relatively to said element, and a fixed member having an annular recess for reception of said sealing element, the improvement which comprises: a pair of cooperating wedgelike working surfaces on said sealing element and said recess, respectively, to effect radially inward compression of said sealing element around said shaft upon relative movement of the working surface on said sealing element with respect to the working surface on said recess; and a normally compressed spring adapted to continuously react between said sealing element and said shaft to effect said relative movement of the working surface on said sealing element and thereby producing an airtight seal between the latter and said shaft to isolate differential pressures obtaining on opposite sides, respectively, of said fixed member, and simultaneously effecting rectilinear movement of said shaft toward its normal position.

References Cited by the Examiner
UNITED STATES PATENTS

| | | | |
|---|---|---|---|
| 1,584,127 | 5/1926 | Norton | 277—117 |
| 2,910,966 | 11/1959 | Bodem | 277—117 |
| 2,936,590 | 5/1960 | Rockwell | 60—54.6 |
| 3,013,535 | 12/1961 | Schultz | 91—376 |
| 3,049,100 | 8/1962 | Rike | 91—376 |

MARTIN P. SCHWADRON, *Primary Examiner.*

PAUL E. MASLOUSKY, *Examiner.*